April 7, 1942.  L. S. HAMER  2,278,849
LINE BLIND
Filed Dec. 20, 1939
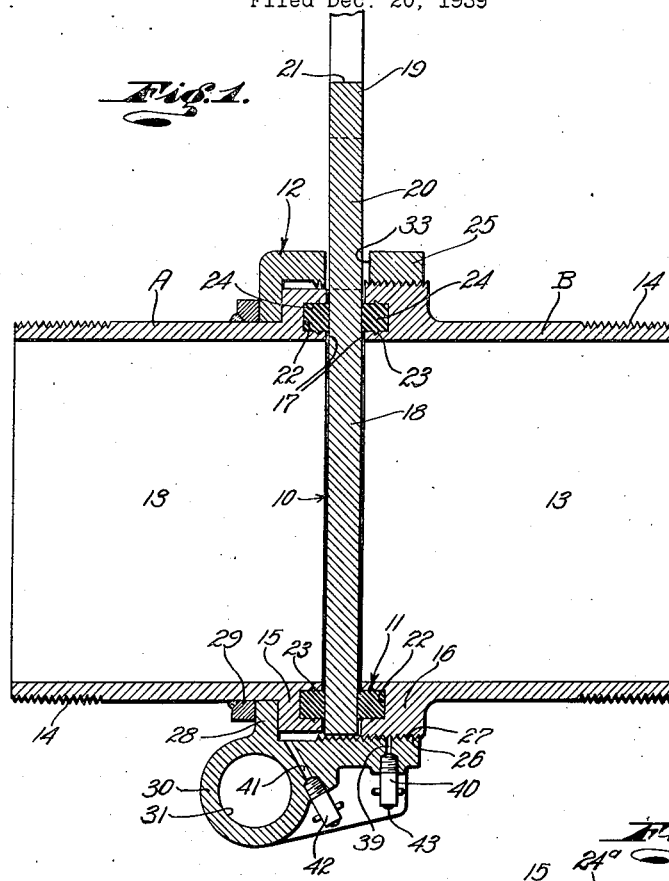
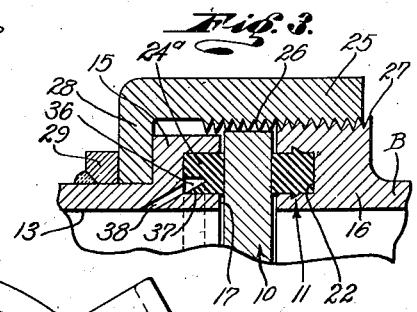
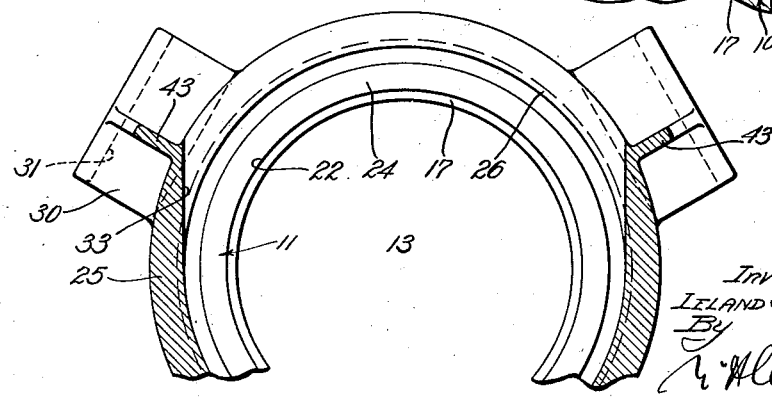
Inventor
Leland S. Hamer
By
His Attorney Patented Apr. 7, 1942

2,278,849

UNITED STATES PATENT OFFICE 2,278,849

LINE BLIND

Leland S. Hamer, Long Beach, Calif., assignor of one-fourth to Paul A. Dewhirst, Los Angeles, Calif.

Application December 20, 1939, Serial No. 310,185

5 Claims. (Cl. 251—167)

This invention relates to fluid handling equipment and relates more particularly to a line blind for installation in a pipe line, or the like. A general object of this invention is to provide a compact, inexpensive, and easily operated line blind.

Pipe lines and fluid handling systems are often provided with line blinds to cut off the flow at points where it may be necessary to replace or repair valves and other equipment. The usual line blind comprises a pair of flanges connected in the pipe line and a plate to be inserted between the flanges. It is a difficult, time consuming operation to spread the line blind flanges to permit the insertion of the plate and while performing this spreading operation the fluid from the line usually leaks away, resulting in a waste and, where the fluid is inflammable, a dangerous fire hazard is created.

Another object of this invention is to provide a line blind in which the plate may be easily and quickly inserted and removed.

Another object of this invention is to provide a line blind that is such that a single workman may readily install and remove the plate by employing a simple lever or rod.

Another object of this invention is to provide a line blind embodying a simple, inexpensive, yet very effective means for spreading the fitting sections to permit the easy insertion and removal of the plate and for moving the sections together to clamp and seal against the plate.

Another object of this invention is to provide a line blind of the character mentioned in which the spreading means or operating means is fully lubricated so that it does not rust, stick, or bind.

A further object of this invention is to provide a line blind embodying novel and very effective means for sealing with the opposite sides of the plate.

The various objects and features of my invention will be fully understood from the following detailed description of typical preferred forms and applications of my invention, throughout which description reference is made to the accompanying drawing, in which:

Fig. 1 is a central, longitudinal, detailed sectional view of the device of this invention showing the imperforate part of the plate in position across the fluid passage. Fig. 2 is a fragmentary transverse detailed sectional view taken in a plane between the body sections with the plate removed and Fig. 3 is an enlarged fragmentary longitudinal detailed sectional view of the device illustrating an alternative form of packing means.

The improved line blind of the present invention illustrated in Figs. 1 and 2 may be said to comprise, generally, two relatively movable tubular sections A and B to be connected in a pipe line or the like, a plate 10 inserted between the sections A and B, means 11 on the sections A and B for sealing with the plate 10, and means 12 for producing relative movement between the sections A and B.

The sections A and B form the body parts of the device and are intended to be connected in a pipe line or fluid handling system to form parts of the same. The sections A and B are elongate tubular elements and their longitudinal openings 13 are in registration and alignment. Means is provided at the outer ends of the sections A and B to facilitate their connection in the pipe line. In the case illustrated the outer parts of the sections A and B have external threads 14 for connecting them with the pipe line parts, it being understood that the sections may be otherwise conditioned for connection in the pipe line. The inner ends of the sections A and B are provided with annular external flanges 15 and 16 respectively. The inner ends of the flanges 15 and 16 are flush with the ends of the sections A and B so that the sections present large opposing end surfaces 17. The surfaces 17 are flat and parallel and are preferably normal to the longitudinal axis of the device. The outer end of the flange 15 is preferably flat and normal to the longitudinal axis of the section A. It will be observed that the sections A and B are simple, inexpensive elements.

The plate 10 is adapted to be arranged between the sections A and B to form a closure for the registering openings 13. The plate 10 is an elongate part having flat parallel side surfaces. The plate 10 is shaped to have two end portions 18 and 19 connected by a narrow web 20. The end portion 18 is imperforate and when in position across the openings 13 forms a full closure. The plate portion 19 has an opening 21 adapted to register with the openings 13 when the plate 10 is turned end for end from the position illustrated. With the plate 10 in the position where the opening 21 registers with the openings 13 the plate does not interfere with the free passage of fluid through the device. While the plate 10 may carry packing means as disclosed in my co-pending application, Serial No. 310,183, filed Dec. 20, 1939, now Patent No. 2,242,467, granted May 20, 1941, I have shown a simple, plain plate 10 arranged in position between the sections A and B to be sealed with by the means 11 on the sections.

The packing means 11 is carried by the sections A and B to seal with the opposite sides of the plate 10 to prevent the leakage of fluid from about the plate. The means 11 includes an annular groove 22 in each section surface 17. The grooves 22 are concentric with the openings 13 and are spaced between the inner and outer margins of the surfaces 17. In practice the grooves 22 may be square or rectangular in cross section and the side walls of the grooves are provided with wickers or V-shaped grooves 23. The sealing means 11 further includes packing rings 24 in the grooves 22. The rings 24 are formed of suitable compressible and resilient packing material that is resistant to the fluid handled. The packing rings 24 are shaped to closely or accurately fit the grooves 22 and are proportioned to project from the surfaces 17 for cooperation with the plate 10. The corners of the projecting parts of the rings 24 are preferably bevelled off. The projecting parts of the rings 24 present flat surfaces for sealing with the flat sides of the plate 10. In practice the packing rings 24 may be tightly pressed or forced into the grooves 22 so that the wickers or grooves 23 serve to lock them in place.

The means 12 is operable to move the sections A and B toward and away from one another to bring the packing rings 24 into sealing engagement with the plate 10 and to free the plate 10 for ready removal. The means 12 is characterized by its simplicity and its ease of operation. The section shifting means 12 includes a rotatable sleeve 25 arranged about the opposing flanges 15 and 16. The sleeve 25 has an internal thread 26 mating with an external thread 27 on the periphery of the flange 16. The threads 26 and 27 are coarse and of substantial pitch. The sleeve 25 surrounds the flange 15 of the section A with suitable clearance. In accordance with the invention the sleeve 25 is held against longitudinal movement relative to the section A so that cooperation of the threads 26 and 27 accompanying rotation of the sleeve produces relative longitudinal movement between the sections A and B. An inwardly projecting annular lip 28 is provided on the sleeve 25 and one side of the lip cooperates with the outer end of the flange 15. A collar 29 is welded or otherwise fixed on the section A and is engaged by the other side of the sleeve lip 28. The engagement of the lip 28 with the flange 25 and the collar 29 prevents longitudinal movement of the sleeve 25 relative to the section A while allowing free rotation of the sleeve.

The sleeve 25 is provided with means to facilitate its easy rotation. A plurality of circumferentially spaced laterally and outwardly projecting lugs 30 is provided on the sleeve 25. Each lug 30 has an opening 31 for receiving a lever or operating bar. A bar engaged in an opening 31 may be readily manipulated to rotate the sleeve 25 and to produce relative longitudinal movement between the sections A and B.

The sleeve 25 is provided with a lateral or radial opening 33 for admitting the plate 10 to its position between the surfaces 17. The opening 33 is aligned with the space between the surfaces 17 and is sufficiently wide to freely pass the plate 10. With the plate 10 in position the plate web 20 is received in the opening 33 with substantial clearance allowing turning of the sleeve 25 relative to the plate 10.

In accordance with the invention means is provided for lubricating the means 12. One or more lubricant ports 39 are provided in the wall of the sleeve 25 to deliver lubricant to the cooperating threads 26 and 27. Suitable grease gun fittings 40 are provided at the outer ends of the ports 39 to facilitate the introduction of lubricant under pressure. One or more ports 41 pass through the wall of the sleeve 25 to admit lubricant to the interior of the sleeve. Lubricant from the ports 41 lubricates the lip 28 and the flange 15 and collar 29 engaged by the lip. Suitable grease gun fittings 42 are provided at the outer ends of the ports 41 to facilitate the introduction of lubricant under pressure to the interior of the sleeve. As illustrated in Fig. 1 of the drawing, the rear sides of the lugs 30 carry reinforcing webs 43 and the grease gun fittings 40 and 42 are arranged in adjacent relation to one of these webs 43 so that they are protected against injury. Lubricant may be supplied to the fittings 40 and 42 from time to time to assure the easy operation of the means 12 and to prevent the parts from rusting and sticking.

Fig. 3 of the drawing illustrates the device of the invention provided with a packing ring 24ᵃ that is actuated both by mechanical pressure and fluid pressure to effectively seal with the line blind plate 10. The ring 24ᵃ is set in a groove 22 and where one ring 24ᵃ is employed it is set in the groove 22 at the upstream or pressure side of the plate 10. The packing ring 24ᵃ is shaped to fully occupy the groove 22 and to project from the adjacent surface 17 so that its outer face engages and seals with the plate 10. Upon movement of the sections A and B toward one another the packing ring 24ᵃ is forced against the plate 10 and thus is actuated by mechanical pressure. The inner or rear side of the packing ring 24ᵃ is relieved to receive fluid pressure. An annular groove 36 is provided in the rear side of the packing ring 24ᵃ. The groove 36 preferably occurs adjacent the inner rear corner of the packing ring 24ᵃ and has a sloping inner wall leaving a tapering sealing lip 37 on the interior of the ring. Spaced ports 38 are provided in the section A to put the groove 36 in communication with the fluid opening 13 of the section. The ports 38 are pitched outwardly and toward the adjacent groove 22 and their outer ends are in communication with the groove 36. Fluid under pressure admitted to the groove 36 by the ports 38 actuates or expands the packing ring 24ᵃ to seal with the plate 10 and the walls of the groove 22. While I have shown a packing ring 24ᵃ arranged in only one of the grooves 22 it is to be understood that a ring of this character may be provided in both grooves 22, if desired.

In the use or operation of the device of this invention the plate 10 may normally occupy the position where its opening 21 is in register with the openings 13 so that there is a free fluid passage through the device. The sleeve 25 is normally in the position where it urges the packing rings 24 against the opposite sides of the plate 10 to provide dependable fluid-tight seals with the plate. When it is desired to close off the pipe line a bar, or the like, is inserted in one of the openings 31 and is manipulated to turn the sleeve 25 in a direction to move the sections A and B apart. This frees the packing rings 24 from the plate 10 and allows the plate to be withdrawn. The plate is turned end for end and re-inserted between the surfaces 17. With the plate 10 again in position the sleeve 25 is rotated to move the sections A and B toward one another. This brings the packing rings 24 into tight sealing engagement with the opposite sides of the plate. The removal and insertion of the plate 10 may be easily and quickly done without the use of wrenches or other tools and with the leakage of little or no fluid.

Having described only typical preferred forms and applications of my invention, I do not wish to be limited or restricted to the specific details herein set forth, but wish to reserve to myself any variations or modifications that may appear to those skilled in the art, or fall within the scope of the following claims.

Having described my invention, I claim:

1. A device of the character described for connection in a pipe line including two tubular sections arranged in end to end relation to define a fluid passage and related for relative longitudinal movement, means for connecting the sections with spaced members of the pipe line, a plate having an imperforate disc-like portion adapted to be inserted between the opposing ends of the sections to extend across said passage, and means for moving the sections toward and away from one another to clamp the plate between said ends and to free the plate for removal, said means including flanges on said ends of the sections, a rotatable sleeve in surrounding relation to the flanges, the sleeve having a transverse slot in its wall for passing said portion of the plate to and from the position between said ends of the sections, the edge of said plate portion being engageable with the internal surface of the unslotted part of the sleeve to center said plate portion between said ends, an inturned lip on the sleeve having one side bearing against the outer end of the flange of one section, a collar on said section engaging the other side of the lip, and cooperating threads on the sleeve and the flange of the other section.

2. A device of the character described for connection in a pipe line including two tubular sections arranged in end to end relation to define a fluid passage and related for relative longitudinal movement, means for connecting the sections with spaced members of the pipe line, a plate having an imperforate disc-like portion adapted to be inserted between the opposing ends of the sections to extend across said passage, packing rings on said ends of the sections, and means for moving the sections toward and away from one another to move the packing rings into and out of sealing cooperation with the plate comprising, an external flange on said end of each section, a rotatable sleeve surrounding said flanges, an inturned lip on the sleeve having one side engaging the outer side of the flange of one section, a collar on said section engaging the other side of the lip, the sleeve having a transverse slot for passing said plate portion to and from its position between the ends of the sections, the edge of said plate portion being engageable with the internal surface of the unslotted part of the sleeve to center said plate portion between said ends of the sections, mating threads on the sleeve and the flange of the other section, and spaced lugs on the sleeve having openings for receiving a tool for turning the sleeve.

3. A device of the character described for connection in a pipe line including two tubular sections arranged in end to end relation to define a fluid passage and related for relative longitudinal movement, means for connecting the sections with spaced members of the pipe line, a plate insert between the opposing ends of the sections to extend across the fluid passage, packing rings on said ends of the sections, and means for moving the sections toward and away from one another to move the packing rings into and out of sealing cooperation with the plate comprising external radial flanges on said ends of the sections, a rotatable sleeve surrounding said flanges, an inturned lip on the sleeve having one side engaging the outer side of the flange of one section, a collar on said section engaging the other side of the lip, the sleeve having a lateral opening for passing the plate to and from its position between the ends of the sections, mating threads on the sleeve and the flange of the other section, and means for supplying lubricant under pressure to the threads and said lip.

4. A device of the character described for connection in a pipe line including two tubular sections arranged in end to end relation to define a fluid passage and related for relative longitudinal movement, means for connecting the sections with spaced members of the pipe line, a plate inserted between the opposing ends of the sections to extend across the fluid passage, there being grooves in the opposing ends of the sections, packing rings set in the grooves and adapted to seal with the opposite sides of the plate, at least one of said rings having an open recess in its rear side, means for conducting fluid pressure from said fluid passage to the recess to actuate the packing ring, and means for moving the sections toward and away from one another to clamp the plate between the packing rings and to free the plate for removal, including a rotatable sleeve in surrounding relation to the sections, spaced shoulders on one section, a lip on the sleeve received between the shoulders, and mating threads on the sleeve and the other section.

5. In a flow control pipe fitting, a sleeve having a relatively narrow transverse slot formed through the wall thereof intermediate its ends, said slot having a length which substantially corresponds with the diameter of the sleeve bore, a pair of pipe sections supported in alignment in the opposite end portions of the sleeve and having their adjacent end faces shaped to provide seating surfaces, means for interconnecting the pipe sections and the end portions of the sleeve so that rotation of the sleeve will cause the end seating surfaces of the pipe sections to move toward and away from each other, and a flow controlling disc-like plate movable through the sleeve slot into and out of a position in the sleeve bore between the seating surfaces of the pipe sections to be clamped or released thereby as a result of their relative movement, the edge of said plate engaging with and conforming to the unslotted portion of said sleeve to properly locate the plate with respect to the seating surfaces of the pipe sections.

LELAND S. HAMER.